United States Patent [19]

Miki et al.

[11] 4,315,519
[45] Feb. 16, 1982

[54] GOVERNOR HYDRAULIC PRESSURE SUPPLY APPARATUS FOR AUTOMATIC TRANSMISSIONS

[75] Inventors: Nobuaki Miki, Nagoya; Shiro Sakakibara, Toyokawa; Fumitomo Yokoyama, Anjo, all of Japan

[73] Assignee: Aisin-Warner Kabushiki Kaisha, Anjo, Japan

[21] Appl. No.: 180,431

[22] Filed: Aug. 22, 1980

[30] Foreign Application Priority Data

Aug. 30, 1979 [JP] Japan .............................. 54-119970[U]

[51] Int. Cl.³ ........................................... G05D 13/34
[52] U.S. Cl. ...................................... 137/56; 411/124
[58] Field of Search ................. 74/752 C; 137/54, 56; 411/113, 123, 124

[56] References Cited

U.S. PATENT DOCUMENTS

| | | | |
|---|---|---|---|
| 508,757 | 11/1893 | Reed | 411/124 |
| 1,871,684 | 8/1932 | Gibbons | 411/124 |
| 3,139,102 | 6/1964 | Powell | 137/56 X |
| 3,631,872 | 1/1972 | Ivey | 137/56 |
| 3,633,595 | 1/1972 | Nagamatsu | 137/56 |

Primary Examiner—Robert G. Nilson
Attorney, Agent, or Firm—Oblon, Fisher, Spivak, McClelland & Maier

[57] ABSTRACT

A governor hydraulic pressure supply apparatus is provided for use with the vehicle automatic transmission system and includes a governor valve mounted on a rotary output shaft from the automatic transmission, the output shaft having an internal input fluid line for supplying a line pressure to the governor valve and an internal output fluid line receiving a governor pressure from the governor valve, and the governor valve body having an internal input fluid line to be connected to the input line from the output shaft and an internal governor pressure output line to be connected to the output line in the shaft, wherein the joined faces between the governor valve and output shaft at which the fluid lines are respectively connected with each other are brought in close contact with each other by tightening the two element by means of a tightening bolt adjacent to the joined faces, thereby preventing fluid leak from the faces.

4 Claims, 7 Drawing Figures

GOVERNOR HYDRAULIC PRESSURE SUPPLY APPARATUS FOR AUTOMATIC TRANSMISSIONS

BACKGROUND OF THE INVENTION

1. Field of the Invention

The present invention relates to a hydraulic governor pressure supply apparatus for use with the vehicle's automatic transmissions, and more particularly to a hydraulic governor pressure supply apparatus which is adapted to be mounted to the output shaft from the automatic transmission case, and provides governor pressure output for the transmission control apparatus according to changes in the vehicle speed.

2. Description of the Prior Art

The prior art hydraulic governor pressure supply arrangement as shown in FIG. 1 includes a rotary output shaft 1 from the automatic transmission (not shown), through the interior of which shaft two parallel hydraulic fluid lines pass, one being an input passage 11 through which a hydraulic line pressure from a hydraulic fluid source flows and the other being an output passage 12 through which a regulated hydraulic governor pressure is provided. The rotary output shaft 1 has an input passage 21 and an output passage 22 therein which are connected to the respective oil passage 11 and 12 as viewed in FIG. 1. The arrangement further includes a governor valve body 2 accommodating a governor valve 23 therein which is actuated by the centrifugal force to regulate a flow through a passage connection between the input passage 21 and output passage 22, the governor valve body 2 being fitted around the rotary output shaft 1 and secured thereto by means of a clip 3. The prior art arrangement illustrated above has a problem, however, since a rising temperature in the hydraulic fluid through the arrangement causes an increasing fluid leak from the interface or jointed faces between the governor valve body 2 and rotary output shaft 1, which results in a decrease in the hydraulic governor pressure. The causes for this problem may be summarized as follows.

(1) The rotary shaft 1 is usually made of steel iron while the governor valve body 2 is made of alluminum alloy. Those different materials used have a different thermal expansion coefficient, which causes a gap to be produced between the jointed faces of the two components;

(2) A rise in the fluid temperature decreases the viscosity of the fluid; and (3) The line pressure and governor pressure being exerted upon the governor valve body 2 in the region A of the jointed faces adjacent to the respective connecting points between the input passages and output passages in the interface between the rotary shaft 1 and governor valve body 2 cause the governor valve body 2 to deviated from the axial center of the rotary shaft 1 to the extent that a greater gap is produced near the points at which the input and output passages are interconnected, respectively. Such loss in the governor pressure may possibly cause the automatic shifting to fail or operate improperly during the vehicle running conditions. The improperly operated shifter may possibly provide an unexpected downshifting from the fourth speed to third speed when the vehicle is running at the highest fourth speed, causing the engine brake to work unexpectedly, the engine to overrun and/or the wheels to spin. In practically all automatic transmissions recently developed and actually installed in vehicles, the automatic shifting point setting usually takes place at the high speed. However, the prior art hydraulic governor pressure supply apparatus used in those vehicles causes a greater amount of hydraulic fluid leak therefrom to occur as clearly shown by the characteristic curve I in FIG. 2, as the vehicle reaches a speed above a certain speed (such as 120 km/h in FIG. 2). This leak decreases the governor pressure, making the automatic shifting in the high speed range difficult or almost impossible.

SUMMARY OF THE INVENTION

In overcoming the above-mentioned problems of the prior art device, it is therefore a principal object of the present invention to provide an improved hydraulic governor pressure supply apparatus which provides varying governor pressure output according to the vehicle speed changes up to the highest speed range, thereby eliminating such a gap as mentioned in the above (1) and (2) and thus minimizing the fluid leakage.

In accordance with the present invention, the above object is attained by joining together the governor valve body and the rotary output shaft from the automatic transmissions by means of a tightening bolt, such that a pressure or pushing force is produced in the region adjoining the connected points at which input and output fluid lines extending from the governor valve body are interconnected at the joined interface with the corresponding input and output lines from the rotary output shaft, and is thus exerted on the interface or jointed faces between the governor valve body and output shaft.

BRIEF DESCRIPTION OF THE DRAWINGS

Those and other objects and features of the present invention will be made apparent from the description which follows hereinafter with reference to several preferred embodiments shown in the accompanying drawings, in which.

DETAILED DESCRIPTION OF THE PREFERRED EMBODIMENTS

Figure 1:
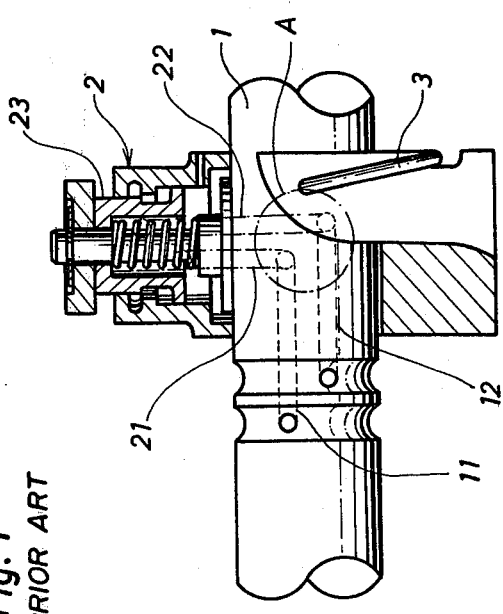
FIG. 1 is a partially cutaway view illustrating the conventional hydraulic governor pressure supply apparatus.
Figure 5:
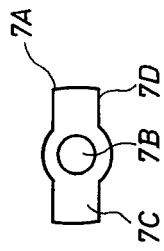
FIG. 5 is a plan view of a lock plate.
Figure 3:
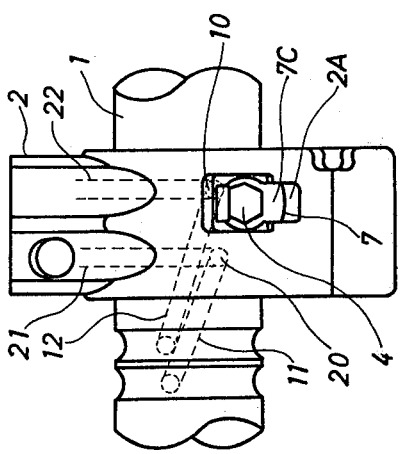
FIG. 3 is a front view of the hydraulic governor pressure supply apparatus according to the present invention.
Figure 4:
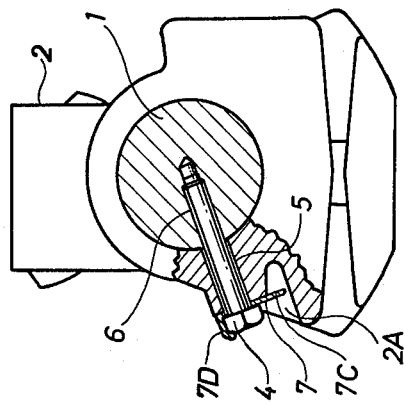
FIG. 4 is a partially cutaway side elevation of FIG. 3.

Referring now to FIGS. 3 to 5, one preferred embodiment of the present invention is illustrated in detail. For clarity and ease of comprehension, in all the figures including FIG. 1, corresponding parts have been given corresponding reference numerals. Reference numeral 4 designates a tightening threaded bolt which is to be inserted into an hole 5 in a governor valve body 2. More particularly, the governor valve body 2 has a hydraulic input line 21 and a hydraulic output line 22 therein, and an rotary output shaft 1 from the automatic transmission has corresponding hydraulic input line 11 and hydraulic output line 12 internally. Those corresponding input and output lines are respectively connected with each other at the interface between the valve 2 and shaft 1 are to be joined together, forming corresponding connected points 10 and 20. The aforementioned hole 5 through the governor valve body 2 is located in the area near the above connecting points 10 and 20. The rotary output shaft 1 has an internally threaded hole 6 of a depth aligned with the hole 5. The tightening bolt 4 is inserted into the hole 5 and then threaded with the hole 6, and is tightened to firmly join the governor valve body 2 and rotary output shaft 1 together in the neighborhood of the connecting points 10 and 20. A locking plate generally designated by 7 is provided for tightening the bolt 4 and governor valve body 2 closely. As particularly shown in FIG. 5, the locking plate 7 is made of a metallic plate 7A which consists of a substantially round central portion having a central hole 7B through which the bolt 4 is to be passed, an arm portion 7C extended on one side from the central portion, and an arm portion 7D extended on the opposite side from the central portion and which part is to be bent outwardly when the plate is mounted with the bolt 4. That is, the tightening bolt 4 is inserted through the lock plate 7 beforehand, and is then inserted into the hole 5 in the governor valve body 2 together with the locking plate 7. After the bolt 4 is tightened to firmly join the valve body 2 and output shaft 1, with the arm portion 7C registering with a recess 2A on the surface of the valve body 2, the arm portion 7D is then so bent outwardly as to be brought in close contact with the head of the bolt 4. The thus formed locking plate 7 catches the bolt head with its hooked portion 7D, securing the bolt 4 so firmly that it cannot be loosened by the vibrations caused by the rotating output shaft 1. In the above described embodiment, it is seen in FIG. 3 that the input line 11 and output line 12 are formed inside the rotary output shaft 1 such that their open ends extend to connect with the corresponding counterparts in the same radial direction of the shaft, and the internally threaded hole 6 for the bolt 4 is formed to extend between those open ends. Such arrangement can most effectively prevent the oil leak.

Figure 6:
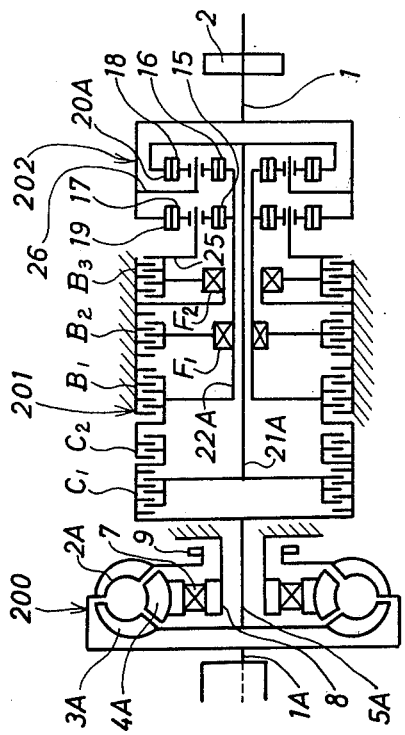
FIG. 6 is a skeleton diagram of the automatic transmission arrangement.
Figure 7:
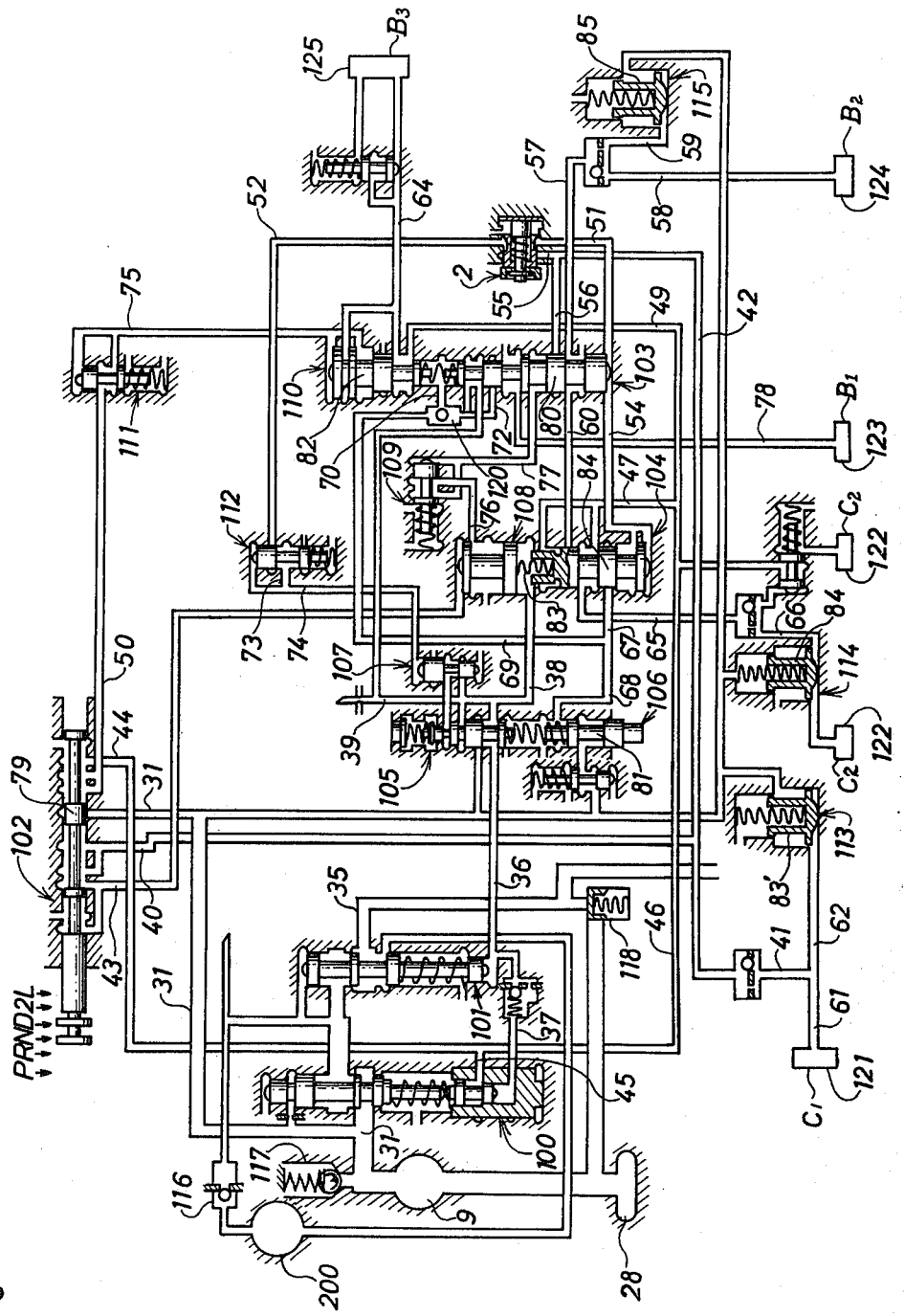
FIG. 7 is a hydraulic circuit diagram of the hydraulic fluid control apparatus for the automatic transmissions.

FIG. 6 is a skeleton diagram of the automatic transmission arrangement controlled by the hydraulic control apparatus for the automatic transmission incorporating the hydraulic governor pressure supply apparatus of the present invention shown in FIG. 7. As shown in FIG. 6, the automatic transmission arrangement includes a hydraulic torque converter 200 and a gear shifter 201, the hydraulic torque converter 200 comprising a pump impeller 2A, a turbine runner 3A and a stator 4A. Power is transmitted from the engine drive shaft 1A through the torque converter 200 to its output shaft 5A and then through the gear shifter 201 to its rotary output shaft 1. The stator 4 is connected to a fixed shaft by way of one-way clutch 7'. Reference numeral 9 designates an oil pump, and 2 designates a governor valve body mounted to the output shaft 1.

The gear shifter 201 is arranged to include friction engaging elements such as clutches $C_1$, $C_2$, brakes $B_1$, $B_2$, $B_3$ and one-way clutches $F_1$, $F_2$, and a planetary gear train 202 including central sun gears 15, 16, pinions 17, 18, and ring gears 19, 20A. Those clutches and brakes, which are actuated in any combination, provide forward three speeds and one reverse as shown in Table I.

TABLE I

| Selected Shifts | | $C_1$ | $C_2$ | $B_1$ | $B_2$ | $B_3$ | $F_1$ | $F_2$ |
|---|---|---|---|---|---|---|---|---|
| Reverse | R | — | O | — | — | O | — | — |
| First speed | D2-Range | O | — | — | — | — | — | O |
| First speed | L-Range | O | — | — | — | ⊚ | — | O |
| Second speed | D-Range | O | — | — | O | — | O | — |
| Second speed | 2-Range | O | — | ⊚ | O | — | O | — |
| Third speed | D-Range | O | O | — | O | — | — | — |

In the above table, a symbol ( O ) indicates that the appropriate brakes and clutches are engaged, respectively or one-way clutch is locked. A double circle indicates that the appropriate brakes are to be actuated when the engine brake works. A bar (—) indicates that the appropriate clutches and brakes are disengaged or one-way clutch is unlocked.

The hydraulic control apparatus comprises an oil tank 28, an oil pump 9 which provides regulated hydraulic output, a first regulator valve 100, a second regulator valve 101, a manual valve 102, a 1-2 shift valve 103, a 2-3 shift valve 104, a throttle valve 105, a kickdown valve 106, a cutback valve 107, an intermediate valve 108, an intermediate modulator valve 109, a low coast shift valve 110, a low modulator valve 112, an accumulator 113 for clutch $C_1$, an accumulator 114 for clutch $C_2$, an accumulator 115 for brake $B_2$, a check valve 116, a pressure relief valve 117, a cooler bypass valve 118, a check valve 120, a hydraulic servomotor or power cylinder 121 for clutch $C_1$, a hydraulic power cylinder 122 for clutch $C_2$, a hydraulic power cylinder 123 for brake $B_1$, a hydraulic power cylinder 124 for brake $B_2$, a hydraulic power cylinder 125 for brake $B_3$, and hydraulic fluid lines interconnecting the above-listed valves and hydraulic power cylinders.

A line pressure in a hydraulic line 31 is introduced into the first regulator valve 100 and also into the manual valve 102, kickdown valve 106, throttle valve 105, accumulators 113, 114 and 115. The throttle valve 105 provides a regulated output, which is fed through a hydraulic line 36 to the second regulator valve 101 and also through a hydraulic line 37 to the first regulator valve 100. The output from the throttle valve is also fed through a hydraulic line 38 to the 2-3 shift valve 104 and through a hydraulic line to the 1-2 shift valve 103.

The line pressure introduced into the kickdown valve 106 through the hydraulic line 31 is fed through hydraulic lines 68 and 67 to the 2-3 shift valve 104, and also through hydraulic line 69 to the check valve 120 which leads through hydraulic lines 70 and 72 to the 1-2 shift valve 103.

The manual valve 102 is used to select the various driving conditions. The regulated line pressure from the first regulator valve 100 is fed to the manual valve 102, which selectively provides the hydraulic fluid (line pressure) to the hydraulic power cylinder 121 for friction clutch $C_1$ through hydraulic lines 40, 41 and 61, to the accumulator 113 through hydraulic lines 40, 41 and 62, to the governor valve 27 through hydraulic lines 40, 42 and 55, to the 1-2 shift valve 103 through hydraulic lines 40, 42 and 56, to the 2-3 shift valve 104 via hydraulic line 43, to the first regulator valve 100 through hydraulic lines 44 and 45, to the 2-3 shift valve via hydraulic lines 44, 46 and 47, to the 1-2 shift valve 103 through hydraulic lines 44, 45 and 49, and to the low coast modulator 111 via hydraulic line 50.

The pressure relief valve 117 interposed in the hydraulic line 31 opens automatically for the release of fluid under the maximum pressure provided by the oil pump 9, and the cooler bypass valve 118 in the fluid line 35 limits fluid to the cooler to a lower pressure.

The governor valve body 2 in the hydraulic governor pressure supply apparatus according to the present invention provides a regulated fluid pressure (governor pressure) output according to changes in the vehicle speed (r.p.m.), and the output is then fed through hydraulic line 52 to the governor modulator valve 112, through line 51 to the 1-2 shift valve 103, and through hydraulic lines 51 and 54 to the 2-3 shift valve 104.

The hydraulic line pressure applied to the 1-2 shift valve 103 via fluid line 56 is then fed through fluid lines 57 and 58 to the hydraulic power cylinder 124 for the friction brake $B_2$, through hydraulic lines 57 and 59 to the accumulator 115, and through fluid line 60 to the 2-3 shift valve 104.

The line pressure applied to the 1-2 shift valve 103 through hydraulic line 49 is then applied to the hydraulic power cylinder 125 for the friction brake $B_3$ through the fluid line 64.

The line pressure applied to the 2-3 shift valve 104 via fluid line 47 is fed through fluid lines 65 and 66 to the accumulator 114 and hydraulic power cylinders 122 for the friction clutches $C_2$.

The line pressure applied to the governor modulator valve 112 from the hydraulic line 52 is regulated in the valve 112 which provides a governor pressure, which is then fed through hydraulic lines 73 and 74 to the cutback valve 107.

The line pressure introduced into the low modulator valve 111 from the fluid line 50 is regulated in the valve 111 which provides output to be fed through fluid line 75 to the low coast shift valve 110.

The line pressure from the hydraulic line 43 is introduced into the intermediate shift valve 108, whose output is connected through fluid line 76 to the intermediate modulator valve 109 which provides a regulated pressure to the 1-2 shift valve 103 through fluid line 77, from which valve 103 the regulated pressure is then introduced through fluid line 78 to the hydraulic power cylinder 123 for brake $B_1$. The manual valve 102 has a valve plug 79 slidably operated by the shifting operation of a lever, etc at the driver's seat, and selectively provides a fluid line pressure in the line 31 in response to the selected lever positions to the fluid lines as shown in Table 2.

TABLE 2

| Selected shifts | P | R | N | D | 2 | L |
|---|---|---|---|---|---|---|
| Line 40 | — | — | — | O | O | O |
| 43 | — | — | — | — | O | O |
| 44 | — | O | — | — | — | — |
| 50 | O | O | — | — | — | O |

In the above table, a Circle symbol ( O ) indicates that the appropriate fluid lines have a line pressure from the manual valve 102 when the appropriate lever positions are selected. A bar (—) indicates that no line pressure is provided to the appropriate fluid lines.

The letters P, R, N. D, 2 and L in the column of the selected lever position have the following meaning, respectively.

P: When the vehicle is parking at rest, the parking lock pawl (not shown) engages with the outer periphery of the front ring gear 19, locking the output shaft 6 by making the pawl catch the gear 19.

R: Reverse.

N: Neutral. The manual valve provides no fluid pressure to any lines, and the engine power is not transmitted to the output shaft 6.

D: Forward. The three forward speeds are provided by the automatic transmission in the embodiment, which automatically shifts through the three speed range.

2: Shifting is automatically between the first and second speeds.

L: The low (first) gear ratio is selected and fixed.

Next, each of the valves which are actuated in response to the selected manual valve positions in order to permit the associated friction elements in Table 1 to operate properly and smoothly is described.

The first regulator valve 100 automatically provides regulated fluid pressures to each of the elements depending on the current vehicle speeds and engine output (throttle positions).

The second regulator valve 101 provides a fluid pressure to the torque converter, lubricating oil pressure, and cooler pressure which are appropriately regulated according to the current vehicle speeds and throttle positions.

The throttle valve 105 provides an appropriate throttle pressure depending on the varying depression of the accelerator pedal, that is the varying engine output. The output pressure provided by the throttle valve 105 according to its opening positions controls the first regulator valve 100 and second regulator valve 101 so that they can provide respective output pressures regulated according to the above throttle output. The throttle out pressure also controls the 1-2 shift valve 103 and 2-3 shift valve 104 so that they can provide output having a force to overcome the governor pressure.

The 1-2 shift valve 103 provides an automatic shifting control between the first and second speeds.

If the governor pressure from the hydraulic line 51 is relatively high, and the throttle pressure from the hydraulic line 39 is relatively low, the valve stem 80 in the 1-2 shift valve 10 is then lifted by the governor pressure, allowing the fluid lines 56 and 57 to be connected. The line pressure is thus fed into the hydraulic lines 57 and 58 through which it is applied to the hydraulic power cylinder 124 for the friction brake $B_2$. Then, the friction brake $B_2$ is operated by the cylinder 124 for engagement, and the second speed shift is thus obtained.

If the governor pressure is relatively low and the throttle pressure is relatively high, the valve stem 80 is lowered by the throttle pressure, allowing the hydraulic lines 56 and 57 to be disconnected, and the first speed shift is thus obtained.

Depressing the accelerator pedal fully causes the valve stem 81 in the kickdown valve 106 to be moved upwardly to open the valve fully, allowing the fluid lines 31 and 68 to be connected. The fluid pressure from the line 31 is thus fed into the line via the valve 106, and is applied through fluid line 67 to the 2-3 shift valve 104 for operating it, and is also applied to the 1-2 shift valve 103 for operation through the fluid line 69, check valve 120 and fluid line 70.

If the selected lever position is in the L-range, the low modulator valve 111 provides a regulated low fluid pressure in response to a line pressure applied thereto through the fluid line 50, and the low pressure is applied through fluid line 75 to the low coast shift valve 110 whose valve stem 82 is actuated to move downwardly, allowing the fluid lines 75 and 64 to be connected. The low fluid pressure from the valve 110 is fed to the hydraulic power cylinder 125 for brake B$_3$, which is actuated for maintaining the shift to the first speed.

If the lever is selected to the R-range, the low coast shift valve 110 is actuated in response to the pressure from the fluid line 49 so that its valve stem 82 is operated to move upwardly against the low fluid pressure from the low modulator valve 111, allowing the fluid lines 49 and 64 to be connected. This connection permits the line pressure from the valve 110 to be fed to the hydraulic power cylinder 125 for brake B$_3$ and the reverse is thus locked.

The governor modulator valve 112 is actuated in response to the governor pressure applied thereto from the fluid line 52, and provides a certain level of regulated governor pressure, which is fed through fluid lines 73 and 74 to the cutback valve 107.

The cutback valve 107 is operated in response to the above governor pressure from the fluid line 74 and the throttle pressure, and provides a regulated cutback pressure which is applied to actuated the throttle valve 105.

Actuating the throttle valve 105 by the cutback pressure has the advantage of preventing any undesired power loss that may be caused by the oil pump 9.

The accumulators 113, 114 and 115 are disposed in the fluid line 59 which leads to the fluid lines 62, 66 and 58, and serve to reduce any shocks that may arise when the corresponding clutches C$_1$, C$_2$ and brake B$_2$ are operated.

Each of accumulator pistons 63', 84' and 85' has a different area between its operating side and back pressure side, such that the operating side is larger than the back pressure side. The back pressure side is always maintained under a line pressure from the fluid line 31, normally placing the pistons 83', 84' and 85' in their upper positions. When a line pressure is introduced into the operating sides from the respective fluid lines 62, 66 and 59, the pistons 83', 84' and 85' are slowly moved downwardly under the line pressure, thus reducing the shocks caused by engaging the friction elements.

The 2-3 shift valve 104 provides the switching operation so that a shifting can take place between the second and third speeds. The switching operation is performed by controlling the valve stem 84 by the governor pressure from the fluid line 54, the throttle pressure opposing the governor pressure from the fluid line 38 and the force of the spring 83.

When the governor pressure is relatively high, the valve stem 84 is moved upwardly against the relatively low throttle pressure and the biasing force of the spring 83, allowing the fluid lines 60 and 65 to be connected. This connection permits the line pressure to flow through the fluid line 66 to the hydraulic power cylinder 122 for the friction clutch C$_2$, and the shifting to the third speed is thus obtained. At this moment, the intermediate shift valve 108 is actuated to cause the fluid lines 76 and 43 to be disconnected to a drain port 85, through which the line pressure acting on the hydraulic power cylinder 123 for the friction brake B$_1$ is to flow out.

If the governor pressure is relatively low, the valve stem 84 is brought back to its lower position by the relatively high throttle pressure and the biasing force of the spring 83, causing the link to the hydraulic power cylinder 123 for the brake B$_1$ to be disconnected. The downshifting to the second speed is thus obtained.

For the kickdown or shifting to lower gear, however, the fluid pressure from the line 67 acts on the valve stem 84 such that it is being pressed down, and herefore the shifting to the second speed is done at higher vehicle speeds than that in the above case.

According to the hydraulic governor pressure supply apparatus which has been described heretofore by illustrating the preferred embodiment thereof, the governor valve body 2 and the rotary output shaft 1 are joined together and tightened by means of the tightening bolt in the neighborhood of the connecting points 10 and 20 at which the internal fluid lines are interconnected. Thus, if the output shaft 1 and the governor valve body are heated to a temperature by the internal fluid flow and an increase in the gap between the jointed faces of the two occur due to a difference in the thermal expansion of the two different materials, it is nevertheless possible to prevent the gap in the neighborhood of the connecting points 10 and 20 from increasing and further increasing due to the hydraulic pressure. The tightening bolt 4 is made of steel or similar material exhibiting a smaller thermal expansion coeffecient than the alluminum alloy used for the governor valve body. Therefore, if there is a rise in temperature, the governor valve body 2 and rotary output shaft 1 are more firmly tightened by the difference in the thermal expansion between the governor valve body and bolt materials. Accordingly, the interface between the governor valve body and output shaft in the neighborhood of the connected portions 10 and 20 is subject to a pressure which tends to bring the two closer to each other, thereby more effectively preventing fluid leaks therefrom.

Figure 2:
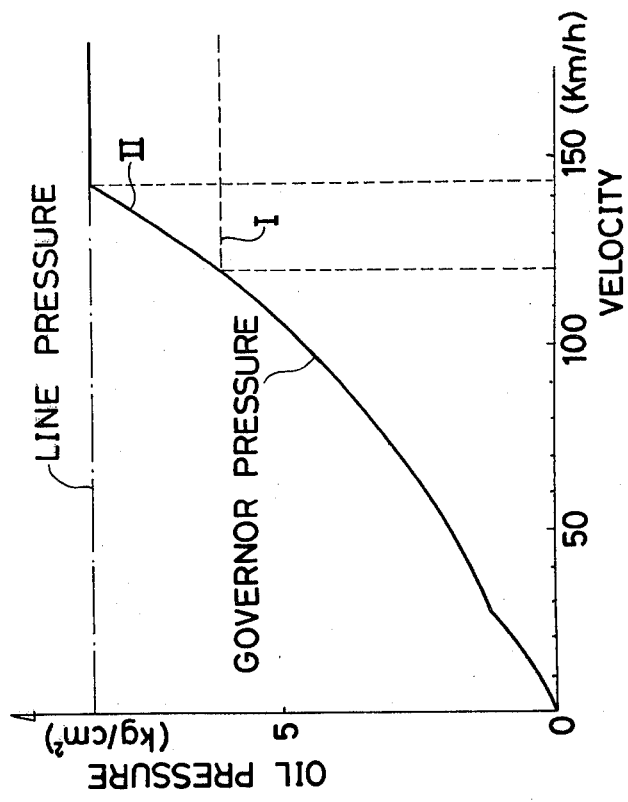
FIG. 2 is a graphical representation of the characteristic curve giving the relationships between the governor pressure and vehicle speeds.

The governor pressure variation provided by the above described embodiment is presented in a graphical form (characteristic curve II) in FIG. 2. The curve II shows that the governor pressure is rising according to increasing vehicle speeds until the pressure reaches a level equal to the input or line pressure.

In the above-described embodiment, a single tightening bolt is employed, but two or more bolts may be used.

Although the present invention has been described by reference to the preferred embodiment thereof, it should be understood that various changes and modifications may be made without departing from the spirit and scope of the invention.

What is claimed is:

1. A hydraulic governor pressure supply apparatus for vehicle's automatic transmissions having governor valve means mounted on an output shaft from the automatic transmissions, the governor valve means including hydraulic fluid input and output lines and the output shaft including hydraulic fluid input and output lines which are connected with the corresponding input and output lines in the governor valve means for supplying an input line pressure to the governor valve means and for receiving a governor pressure output from the valve means, respectively, wherein the improvement includes tightening bolt means for tightening the combined governor valve means and output shaft in the region adjoining the interface between the two elements at which the input fluid lines and output fluid lines are connected with each other, respectively, the tightening bolt means being screwed to the shaft thereby producing a pressure or pushing force in the above region to bring the two elements in closer contact with each other in said region.

2. A hydraulic governor pressure supply apparatus as defined in claim 1, wherein the input and output lines from the output shaft have open ends and are formed to extend parallelly in the same radial direction of the shaft so as to connect with the corresponding input and output lines in the governor valve means, said input and output lines in said governor valve means also having open ends, and the governor valve means and the output shaft have holes located between the open ends of said input and output lines and aligned with each other for accommodating the tightening bolt means therein.

3. A hydraulic governor pressure supply apparatus as defined in claim 1, wherein the tightening bolt means has locking means to be attached thereto for tightening the bolt means and governor valve means firmly.

4. A hydraulic governor pressure supply apparatus as defined in claim 3, wherein the locking means is a metallic plate having a central bore portion for receiving the bolt means therethrough, an arm portion extended on one side from the central portion and adapted to engage with the governor valve means, and a bendable arm portion extended on the opposite side from the central portion and adapted to catch the head of the bolt means.

* * * * *